United States Patent [19]

Pearman et al.

[11] Patent Number: 5,656,918

[45] Date of Patent: Aug. 12, 1997

[54] APPARATUS FOR CONTROLLING A LOAD CONNECTED TO AN ENGINE

[75] Inventors: Kevin Patrick Pearman, Bedfordview; David Joseph Peart, Johannesburg, both of South Africa

[73] Assignee: John Galgut, South Africa

[21] Appl. No.: 454,306

[22] PCT Filed: Dec. 16, 1993

[86] PCT No.: PCT/EP93/03637

§ 371 Date: Jun. 19, 1995

§ 102(e) Date: Jun. 19, 1995

[87] PCT Pub. No.: WO94/14222

PCT Pub. Date: Jun. 23, 1994

[30] Foreign Application Priority Data

Dec. 17, 1992 [ZA] South Africa .................. 92/9746

[51] Int. Cl.$^6$ .................................................. H02J 7/04
[52] U.S. Cl. ............................................................ 320/30
[58] Field of Search .......................... 123/527, 198 DB, 123/352, 327, 571, 587, 684, 672; 180/271; 320/30

[56] References Cited

U.S. PATENT DOCUMENTS

| | | | |
|---|---|---|---|
| 4,300,088 | 11/1981 | Hicks | 320/61 |
| 4,651,081 | 3/1987 | Nishimura et al. | 320/64 |
| 5,038,728 | 8/1991 | Yoshida et al. | 123/198 |

FOREIGN PATENT DOCUMENTS

| | | | |
|---|---|---|---|
| AUA85500 | 6/1983 | Australia | G05B 9/00 |
| 3104864 | 8/1982 | Germany . | |
| 3203240 | 8/1983 | Germany . | |

*Primary Examiner*—Aditya Krishnan
*Attorney, Agent, or Firm*—Michael D. Bednarek; Kilpatrick Stockton LLP

[57] ABSTRACT

Apparatus for controlling a load connected to an internal combustion engine during operation is disclosed and claimed. The apparatus comprises a suction switch (12) which is sensitive to a decrease in vacuum in the manifold (16) of the vehicle when more motive power is required. The switch (16) causes a controller (30), at terminal (44) thereof, to provide a voltage higher than a predetermined set voltage at the D+ terminal of a conventional regulator (46), thereby to interrupt current flow in the excitation circuit of a conventional alternator (48). The alternator is consequently switched off to reduce the load connected to the engine, thereby to make more engine power available to the drive wheels of the vehicle. The apparatus thus also serves as a fuel saving device.

14 Claims, 3 Drawing Sheets

APPARATUS FOR CONTROLLING A LOAD CONNECTED TO AN ENGINE

In U.S. Pat. No. 4,300,088 to Hicks and with reference to FIG. 2 of the specification, there is disclosed an electric charging apparatus for ground vehicles. The apparatus disclosed comprises an alternator including an excitation circuit comprising a rotor winding and a generator circuit comprising a three-phase stator winding. The apparatus further comprises control means connected to a brake pedal of the vehicle arranged such as to excite the excitation circuit dependent on the extent of actuation of the brake pedal. The said control means replaces the conventional regulator of conventional alternators. If the brake pedal is not actuated, the excitation circuit is not excited so that the alternator does not present a load to the vehicle engine. However, when the brake pedal is actuated, the excitation circuit is energised, thereby causing the generator circuit to become operative. The more the brake pedal is actuated, the larger the output current of the generator circuit becomes. With this apparatus, the electrical generating and charging system is operative only during braking operations, so as to take advantage of the energy which is usually dissipated as heat in the brake system, to produce electrical battery charging power.

Although operating economics may be achieved with this system, it suffers from the disadvantage that measured against the total driving time of a vehicle, the proportion of town driving with long waiting times during which the engine idles and cruising on the open road, when the brakes are also not applied, is very great. During these periods the alternator would not be operative. The periods during which the alternator would be operative may not be sufficient and this may cause damage to the alternator and/or the battery of the vehicle.

OBJECT OF THE INVENTION

Accordingly, it is an object of the present invention to provide alternative apparatus with which the applicant believes the aforementioned problems may at least be alleviated and which would also improve the economy and/or performance of engines.

SUMMARY OF THE INVENTION

According to the invention apparatus for controlling a load connected to an internal combustion engine during operation comprises:

means sensitive to a demand for an increase in output power to be generated by the engine; and means response to said sensitive means connected to remove part of a load connected to the engine, thereby to make more of the power generated available to a remaining part of the load.

The means sensitive to a demand for an increase in output power may comprise means sensitive to a decrease in vacuum, in use, created in a manifold region of the engine.

Said means sensitive to a decrease in vacuum may comprise a vacuum switch comprising a diaphragm which is in suction communication with the manifold region of the vehicle and operable under the influence of vacuum to actuate an electronic switch element.

The vacuum switch preferably comprises adjustment means for displacing said diaphragm and said switch element relative to one another.

The means responsive to the sensitive means may comprise an electronic controller comprising an input and an output, the input being connected to said electronic switch element and the output to said part of the load.

The said part of the load preferably comprises an alternator and a voltage regulator therefor connected in an excitation circuit of the alternator. The electronic controller preferably comprises voltage generator means connected via said output of the controller to the voltage regulator for generating a voltage in response to a signal from said sensitive means for interrupting current flow in the excitation circuit, thereby to switch off the alternator.

The voltage regulator preferably comprises first, second and third terminals. The third terminal is preferably connected to the excitation circuit and the regulator is adapted to interrupt current flow through said third terminal if a voltage applied across said first and second terminals exceeds a set value. The said voltage generator means preferably comprises a DC to DC converter connected to said first and second terminals and operative, when switched on, to generate a voltage larger than said set value.

Said part of the load may further comprise an air-conditioning system of a vehicle driven by the engine and the electronic controller may comprise an enable and disable circuit to disable the air-conditioning system, in response to a signal from said means sensitive to a demand for an increase in output power to be generated by the engine.

Said enable and disable circuit may comprise time delay means for causing a time delay before the air-conditioning system is enabled again.

The controller may further comprise a battery voltage sense circuit and switch means for switching said voltage generator means off, if the voltage of a battery connected to the controller has fallen to below a predetermined value.

BRIEF DESCRIPTION OF THE DIAGRAMS

The invention will now further be described, by way of example only, with reference to the accompanying diagrams wherein.

DESCRIPTION OF A PREFERRED EMBODIMENT OF THE INVENTION

Figure 1:
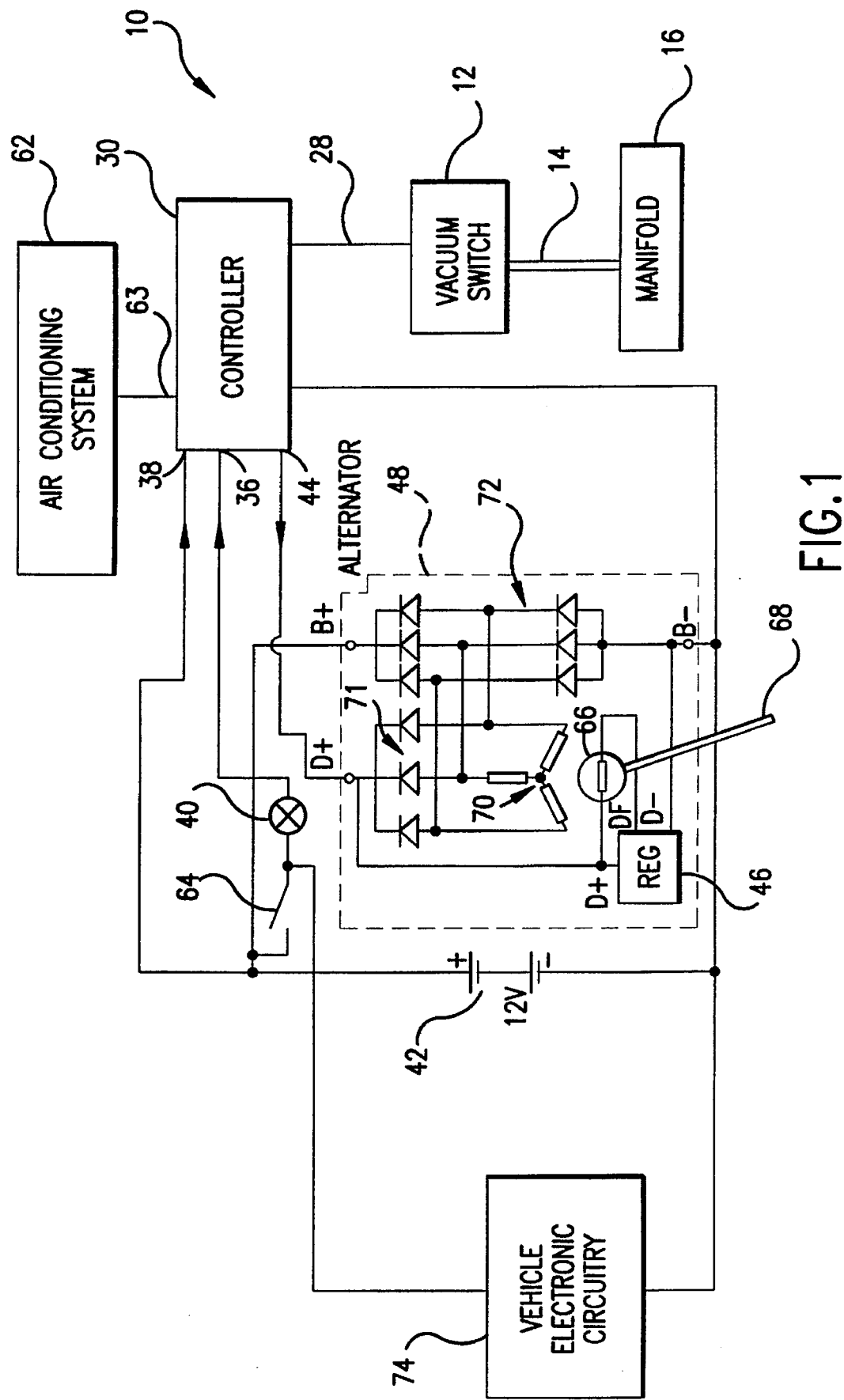
FIG. 1 is a block diagram of one embodiment of the invention and certain relevant components of a motor vehicle comprising an internal combustion engine.

In FIG. 1 there is shown a diagrammatic block diagram of a first embodiment of the apparatus 10 according to the invention and certain relevant components of a vehicle (not shown) comprising an internal combustion engine (also not shown).

The apparatus 10 comprises means sensitive to a demand for an increase in power to be generated by the engine in the form of a vacuum switch 12. The vacuum switch 12 is connected via a suitable suction conduit 14 to a manifold region 16 of the engine. Upon a demand for an increase in output power, for example when the accelerator pedal (not shown) of the vehicle is depressed further to accelerate the vehicle or to climb a hill or the like, the vacuum created in the manifold region is decreased. The vacuum generated in the manifold region of an internal combustion engine is inversely proportional to the power demanded, which in turn is proportional to the degree of depression of the accelerator pedal.

Figure 3:
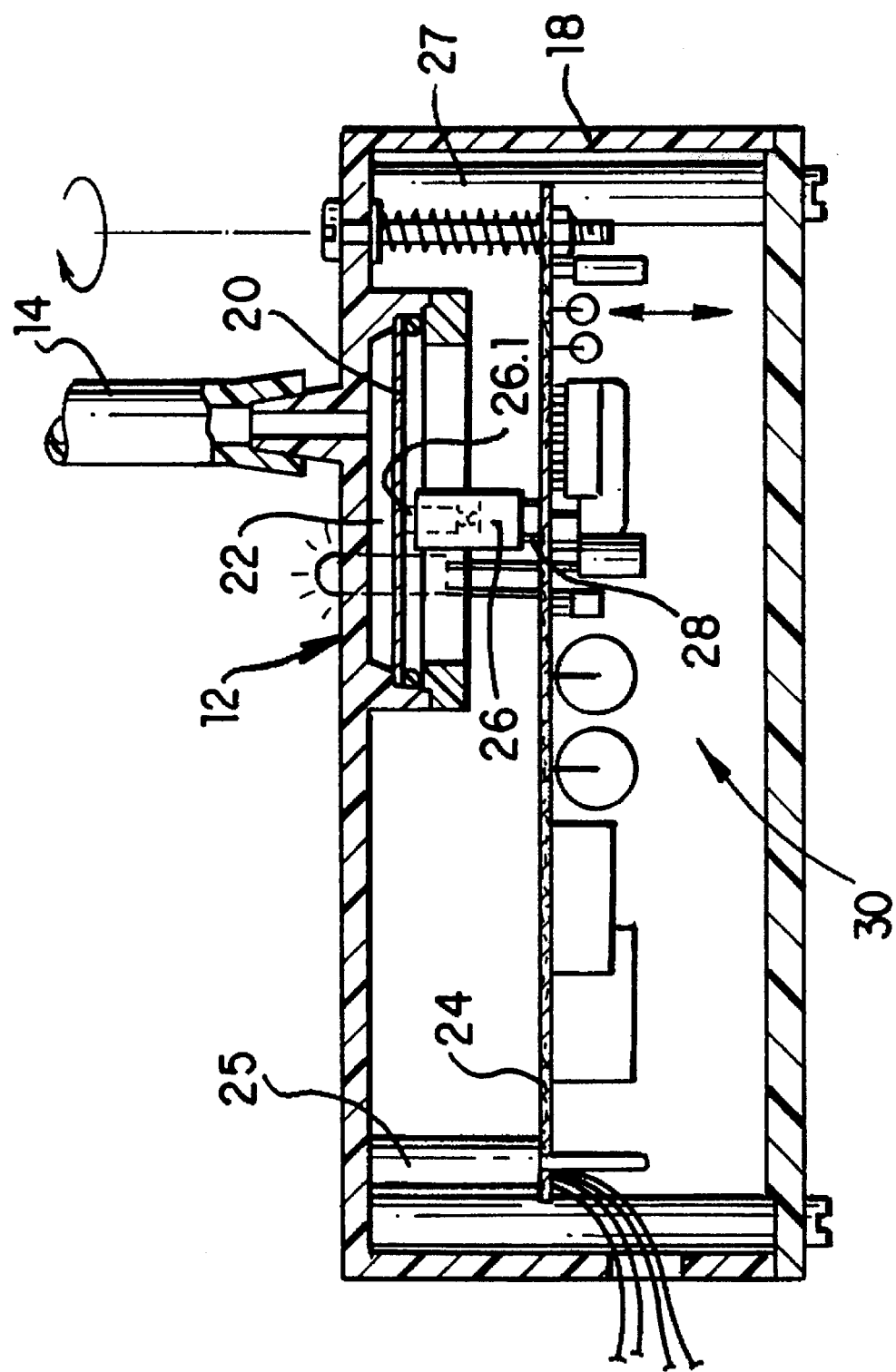
FIG. 3 is a diagrammatic sectional view through a housing of the apparatus according to the invention.

The physical construction of the apparatus 10 is shown in more detail in FIG. 3. The vacuum switch 12 is housed in a housing 18 for the apparatus. The vacuum switch 12 comprises a thin metal diaphragm 20 mounted in the housing to form one wall of a fluid tight chamber 22 in the housing communicating via conduit 14 with the manifold region 16. A micro-switch 26 is mounted with other electronic circuitry on a printed circuit board 24 so that the actuation button 26.1 of the switch 26 is located underneath diaphragm 20. At one end thereof, board 24 is mounted on pillars 25 in housing 18. At the other end it is suspended from a spring biased adjustment screw 27 extending through housing 18, so that the distance of micro-switch 26 from the diaphragm is manually adjustable from outside of the housing, when the housing is closed.

During normal operation of the engine and vehicle, that is during idling and cruising, the suction in the manifold region 16 cases diaphragm 20 to bulge away from the switch 26. Switch 26 is then in a normally open (NO) position, but as the vacuum decreases as a result of actuation of the accelerator pedal, the diaphragm adopts its normal flat form, shown in FIG. 3, wherein it actuates button 26.1 to close switch 26. Electrical wires 28 connect switch 26 of vacuum switch 12 to means responsive to the vacuum switch in the form of electronic controller 30 made up by the aforementioned electronic components on printed circuit board 24.

Figure 2:
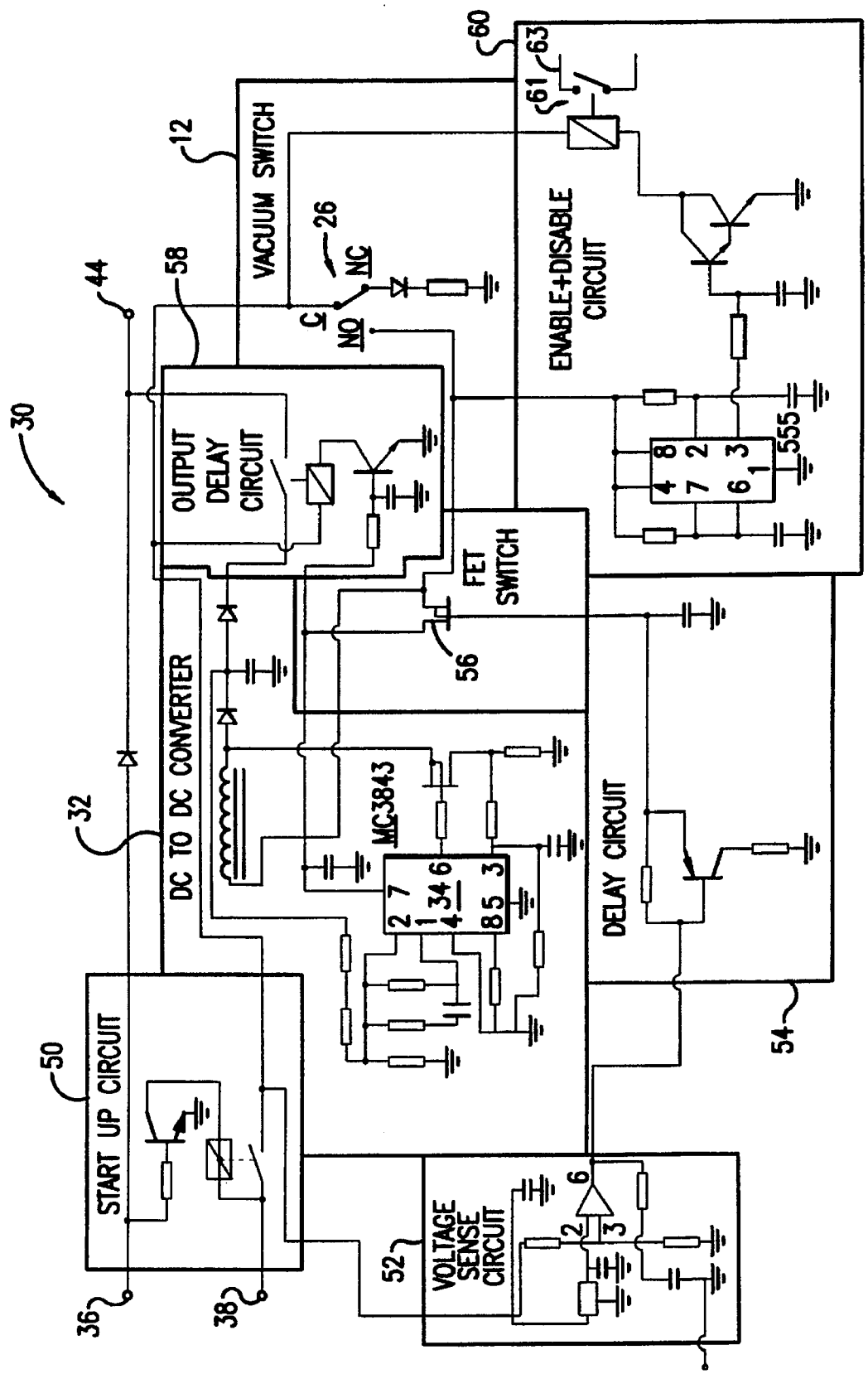
FIG. 2 is a circuit diagram of the one embodiment of the invention.

As best shown in FIG. 2, the controller 30 comprises a DC to DC converter 32 comprising an integrated circuit pulse width modulator 34. As shown in FIGS. 1 and 2, the controller 30 is connected at 36 and 38 respectively to the indicator light 40 of the vehicle and the 12 volt battery 42 of the vehicle. When the converter 32 is switched off, that is when switch 26 is open, there is provided substantially 12 V at output terminal 44 of the controller. However, when the switch 26 is closed, converter 32 starts operating and then there is provided a 18 V DC voltage at output 44. Output 44 is connected to a $D^+$ terminal of the conventional regulator 46 of conventional alternator 48 of the vehicle.

Referring now only to FIG. 2, the controller further comprises a start up circuit 50; a voltage sense circuit 52; a one minute delay circuit 54 connected to the output of the voltage sense circuit; a field effect transistor (FET) switch 56 connected between a normally open contact (NO) of the micro-switch 26 and the pulse width modulator 34; an output delay circuit 58 connected between the converter 32 and output terminal 44 and an enable an disable circuit 60 for an air-conditioning system of the vehicle, shown at 62 in FIG. 1.

Referring now to FIG. 1, conventional alternator 48 is connected in conventional manner at its $B^+$ and $B^-$ terminals across the vehicle battery 42. As indicated hereinbefore, the $D^+$ terminal is also connected to the battery 42 via ignition switch 64, ignition lamp 40, input terminal 36 of controller 30 and output terminal 44 of controller 30.

The alternator 48 comprises an excitation circuit comprising a rotor 66 with excitation windings. The rotor is connected via a drive train 68 to be driven by the engine of the vehicle. The alternator further comprises a generator circuit comprising a stator 70 comprising a three-phase winding system. A bridge circuit 72 connects the outputs of the three-phase winding to the $B^+$ and $B^-$ terminals of the alternator. Exciter diodes 71 and the negative diodes of bridge circuit 72 are connected in the excitation circuit together with regulator 46 in conventional manner.

The regulator 46 has first, second and third terminals $D^+$, $D^-$ and DF respectively. If the voltage between terminals $D^+$, $D^-$ is lower than a predetermined set value, the regulator is operational and regulates current flow in the excitation circuit in conventional manner. However, if the voltage between terminals $D^+$ and $D^-$ exceeds the predetermined set value, a switch system (not shown) in the regulator opens, thereby interrupting current flow through the excitation circuit. When current in the excitation circuit is interrupted, the alternator is switched off and it then does not generate a voltage in the stator 70, to drive the electronic circuit 74 of the vehicle or to charge the battery 42. It thus ceases to be a load to the engine of the vehicle except, of course, for some friction losses in the alternator 48.

In use, when a demand for more output power from the vehicle engine is made by further depressing the accelerator pedal, either to accelerate the vehicle or to climb a hill, the suction in the manifold region 16 decreases, causing diaphragm 20 to actuate button 26.1 of micro-switch 26, thereby to connected the normally open (NO) contact of switch 26 to the common terminal C, both shown in FIG. 2.

The DC to DC converter 32, which is normally off so that 12 volt is available at output 44 of the controller, is switched on to provide 18 V at output 44. This voltage exceeds the aforementioned predetermined set voltage for regulator 46 causing the aforementioned switch in the regulator to open and the current flow in the excitation circuit to be interrupted, thereby to switch the alternator 48 off as hereinbefore described. At the same time relay 61 of enabling and disabling circuit 60 causes air-conditioning system 62 also to be switched off by opening circuit 63.

Thus, part of the load connected to the engine of the vehicle i.e. the alternator 48 and air-conditioning system 62 is removed, thereby making more of the output power available to the driving wheels of the vehicle.

When the accelerator pedal is kept in a constant position again, the vacuum in manifold 16 increases causing the diaphragm 20 to bulge and the NC terminal of switch 26 to be connected to the common terminal. The DC to DC converter is then switched off so that 12 V is available at output 44. The alternator 48 is then energised in the conventional manner through pre-excitation, and maintained on by self-excitation.

After a delay determined by the 555 timer forming part of the enable and disable circuit 60, the air-conditioning system is energised again.

The voltage sense circuit 52 (shown in FIG. 2) senses the battery voltage and if it becomes too low, the DC to DC converter 32, if on, is switched off by switch 56, thereby to start the alternator 48 again to charge the battery 42.

It will be appreciated that there are many variations in detail on the apparatus according to the invention without departing from the scope and spirit of the appended claims.

We claim:

1. Apparatus for controlling a load connected to an internal combustion engine during operation, the engine including an inlet manifold, said apparatus comprising:
   a vacuum switch sensitive to a decrease in a vacuum in the manifold and comprising a diaphragm which is in suction communication with the manifold, an electronic switch element actuated by said diaphragm, and adjustment means for displacing said diaphragm and said switch element relative to one another, and
   means for removing a portion of the load on the engine to thereby increase power available from the engine to the remaining load, said means for removing being responsive to said vacuum switch.

2. Apparatus for controlling a load connected to an internal combustion engine during operation, the engine including an inlet manifold and the load including an alternator having an excitation circuit and a voltage regulator therefor connected to said excitation circuit, the voltage regulator rendering the excitation circuit inoperative when subject to a voltage in excess of a predetermined voltage, said apparatus comprising:

power sensitive means for sensing a demand for an increase in output power from the engine;

operative means for responding to said power sensitive means, said operative means being connected to remove the part of the load connected to the engine to thereby make more of the power generated by the engine available to a remaining part of the load, said operative means comprising voltage generator means connected to said voltage regulator, said voltage generator means when operated generating a voltage in excess of said predetermined voltage.

3. Apparatus as claimed in claim 2 wherein said voltage regulator comprises first, second and third terminals, wherein the third terminal is connected to the excitation circuit; wherein the regulator is adapted to interrupt current flow through said third terminal if a voltage applied across said first and second terminals exceeds a predetermined set value; wherein said voltage generator means comprises a DC to DC converter connected to said first and second terminals; and wherein said DC to DC converter is operative, when switched on, to generate a voltage larger than said predetermined set value.

4. Apparatus as claimed in claim 2 comprising a battery connected to be charged by said alternator; a battery voltage sense circuit; and de-actuating switch means connected to the voltage sense circuit for de-actuating said voltage generator means, if the voltage of the battery has fallen to below a predetermined value.

5. Apparatus as claimed in claim 4, wherein said de-actuating switch means incorporates time delay means.

6. Apparatus as claimed in claim 1, wherein said adjustment means comprises:

a flexible plate, an electronic switch element connected between said plate and said diaphragm, and support means carrying said plate in spaced relation with said diaphragm, said support means incorporating a pair of interengaging screw-threaded members, one of said members being connected to said plate so that on relative rotation of said screw-threaded members said plate will be moved relative to said diaphragm, such that said location of said electronic switch between said plate and said diaphragm changes.

7. Apparatus as claimed in claim 6, wherein said vacuum switch is housed in a housing and said other interengaging screw-threaded member extends outside the housing.

8. A motor vehicle comprising:

an internal combustion engine having an inlet manifold;

an alternator having an excitation circuit and being driven by said engine;

a voltage regulator for said alternator connected to said excitation circuit of said alternator, said voltage regulator being constructed and arranged to render said excitation circuit inoperative when subject to a voltage in excess of a predetermined voltage, thereby switching off said alternator;

power sensitive means for sending a demand for an increase in output power to be generated by said engine; and voltage generator means for generating a voltage in excess of said predetermined voltage and being connected to said power sensitive means to be actuated thereby, and to said voltage regulator.

9. A motor vehicle comprising:

an internal combustion engine having an inlet manifold;

an alternator having an excitation circuit and being driven by said engine;

a vacuum switch sensitive to a decrease in vacuum in said manifold and comprising:

a diaphragm which is in suction communication with said manifold, an electronic switch element actuated by said diaphragm, and adjustment means for displacing said diaphragm and said switch element relative to one another, and means, responsive to said vacuum switch, for a load on to the engine, thereby making more of the power generated by said engine available to a remaining part of said load.

10. A motor vehicle as claimed in claim 9 wherein said adjustment means comprises:

a flexible plate, an electronic switch element being connected between said plate and said diaphragm, support means carrying said plate in spaced relation with said diaphragm, said support means incorporating a pair of interengaging screw-threaded members, one of said members being connected to said plate so that on relative rotation of said screw-threaded members said plate moves relative to said diaphragm so that a location of said electronic switch between said plate and said diaphragm changes.

11. A motor vehicle as claimed in claim 9, wherein said vacuum switch is housed in a housing and said other interengaging screw threaded member extends outside said housing.

12. A motor vehicle comprising an internal combustion engine including an inlet manifold;

an alternator having an excitation circuit;

a voltage regulator for said alternator connected in said excitation circuit, said voltage regulator being constructed and arranged to render said excitation circuit inoperative when subject to a voltage in excess of a predetermined voltage;

a vacuum switch sensitive to a decrease in vacuum in the manifold and comprising:

a housing, a chamber within said housing which is in suction communication with said manifold, a diaphragm constituting one wall of said chamber, a printer circuit board within said housing spaced and from said diaphragm, pillars connected to said housing and to one end of said printed circuit board, a screw carried by said housing and having one end projecting outside said housing and another end engaging said printed circuit board, an electronic switch element carried by said printed circuit board and having an actuation button which engages said diaphragm according to a pressure drop in said manifold, said electronic switch element is spaced from said diaphragm when said pressure has risen above a certain amount, the distance between said electronic switch element and said diaphragm being adjusted by rotating said screw, to thereby adjust the operation of said vacuum switch; and operative means for responding to said vacuum switch, said operative means comprising generator means actuated by said vacuum switch and being connected to said voltage regulator, said generator means being constructed and arranged to generate a voltage in excess of said predetermined voltage.

13. A motor vehicle as claimed in claim 12, wherein said operative means incorporates a DC to DC converter for generating a voltage larger than said predetermined value.

14. A vacuum switch for connection to the manifold of a motor vehicle engine, the vacuum switch comprising a housing;

a chamber within said housing which is in suction communication with said manifold;

a diaphragm constituting one wall of said chamber;

a printed circuit board within said housing spaced from said diaphragm;

pillars connected to said housing and to one end of said printed circuit board to support said printed circuit board, and a screw carried by said housing and having one end projecting outside said housing and the other end engaging said printed circuit board.

* * * * *